United States Patent [19]

Gatsis

[11] 3,957,622

[45] May 18, 1976

[54] TWO-STAGE HYDROCONVERSION OF HYDROCARBONACEOUS BLACK OIL

[75] Inventor: John G. Gatsis, Des Plaines, Ill.

[73] Assignee: Universal Oil Products Company, Des Plaines, Ill.

[22] Filed: Aug. 5, 1974

[21] Appl. No.: 495,686

[52] U.S. Cl. ................................. 208/89; 208/210
[51] Int. Cl.² ......................................... C10G 23/02
[58] Field of Search ............... 208/210, 59, 89, 58, 208/216

[56] References Cited
UNITED STATES PATENTS

| | | | |
|---|---|---|---|
| 3,530,062 | 9/1970 | Gatsis | 208/59 |
| 3,640,817 | 2/1972 | O'Hara | 208/111 |
| 3,820,728 | 8/1974 | Mounce | 208/59 |

*Primary Examiner*—Delbert E. Gantz
*Assistant Examiner*—G. J. Crasanakis
*Attorney, Agent, or Firm*—James R. Hoatson, Jr.; Thomas K. McBride; William H. Page, II

[57] ABSTRACT

Asphaltene-containing hydrocarbonaceous black oils are subjected to conversion conditions in a two-stage process. The physical characteristics of the catalytic composite disposed within the individual stages, or reaction zones, are different. This difference in physical characteristics is directed toward macropore volume, and is maintained whether the chemical composition is the same, or varies.

4 Claims, No Drawings

TWO-STAGE HYDROCONVERSION OF HYDROCARBONACEOUS BLACK OIL

DISCLOSURE

The invention herein described is particularly directed toward a two-stage process for the conversion of hydrocarbonaceous charge stocks. In particular, the invention is adaptable for the conversion of asphaltene-containing black oils which are further contaminated by high-boiling sulfurous and nitrogenous compounds.

Petroleum crude oils, and topped or reduced crude oils, as well as other heavy hydrocarbon fractions and/or distillates, including heavy cycle stocks, visbreaker liquid effluent, atmospheric and vacuum crude tower bottoms products, shale oils, coal tars, tar sand oils, etc., all of which are commonly referred to in the art as "black oils," are contaminated by significant quantities of various nonmetallic and metallic impurities. Among the nonmetallic contaminants are nitrogen, sulfur and oxygen. In addition, heavy hydrocarbonaceous black oil contains high molecular weight asphaltenic compounds. These are nondistillable coke precursors which generally contain sulfur, nitrogen, oxygen and various metallic components. Of the metallic contaminants, those comprising nickel and vanadium are most common, generally existing as organometallic compounds of relatively high molecular weight. With respect to a process for effecting the conversion of such hydrocarbon fractions, the presence of asphaltenic material interferes considerably with the capability of the catalytic composite to effect the destructive removal of nitrogenous, sulfurous and oxygenated compounds, as well as its ability to convert heavy hydrocarbonaceous material into lower-boiling products.

A wide variety of heavy hydrocarbon fractions and/or distillates may be converted and substantially decontaminated through the utilization of the present invention. Exemplary of such charge stocks is a Wyoming sour crude oil having a gravity of 23.2° API at 60°F., contaminated by 2.8 percent by weight of sulfur, 2,700 ppm. of total nitrogen, and containing a high-boiling pentane-insoluble asphaltenic fraction in an amount of about 8.4 percent by weight. Another such charge stock is a crude tower bottoms product, having a gravity of 14.3° API, and containing 3.0 percent by weight of sulfur, 3,830 ppm. of total nitrogen, 85 ppm. of total metals and about 10.93 percent by weight of asphaltenic compounds.

In accordance with the present invention, such hydrocarbonaceous charge stocks are processed in a fixed-bed catalytic system containing at least two physically different catalytic composites. As hereinafter set forth in greater detail, the emphasis is on the physical differences of the catalytic composites rather than the chemical characteristics. That is, the composition of the catalytic composites may be the same, or may be different, the important criteria being the physical differences between the two catalytic composites.

A principal object of the present invention is to provide a process for the conversion of an asphaltene-containing hydrocarbonaceous charge stock. A corollary objective is to effect a substantial degree of decontamination with respect to sulfurous and nitrogenous compounds.

Another object of the present invention is to afford a two-stage process wherein desulfurization is effected in the first stage with hydrocracking and asphaltene-conversion being effected in the second stage.

As hereinabove set forth, these objectives are achieved through the utilization of catalytic composites having different physical characteristics. Therefore, in one embodiment, the present invention provides a process for the conversion of an asphaltene-containing hydrocarbonaceous charge stock which comprises reacting said charge stock and hydrogen in a first reaction zone, in contact with a first catalytic composite, less than 50 percent of the macropore volume of which is characterized by pores having pore diameters greater than about 1000 Angstroms, and reacting the resulting first zone effluent and hydrogen in a second reaction zone, in contact with a second catalytic composite, more than 50 percent of the macropore volume of which is characterized by pores having pore diameters greater than about 1000 Angstroms.

Other embodiments of my invention involve operating conditions and techniques, as well as preferred catalytic components for use in the multiple reaction zones. Additional embodiments involve the means through which the different physical characteristics are derived. As hereinafter set forth, one such means involves the concentration of boron phosphate within the porous carrier material with which the catalytically active metallic components are combined.

I have observed that sulfur contained in the heptane insolubles portion of a black oil is more difficult to remove than the sulfur contained in the distillable portion. Also, most of the asphaltic sulfur reduction results from conversion of the asphaltenes and not from desulfurization of the asphaltenes. Asphaltenes are converted at a very slow rate and very little change occurs in the remaining asphaltenes regardless of the level of overall residuum desulfurization. A catalyst with a relatively small pore diameter can only accommodate a small fraction of the asphaltenes and most of the asphaltenes bypass the catalyst and remain untouched. With these observations in mind, I believe that a superior process for the conversion of a hydrocarbonaceous black oil is achieved by first processing the black oil with a catalyst which reduces the sulfur in the distillable portion, and then by processing the effluent from the first catalyst with a second catalyst which permits accelerated conversion and desulfurization of the asphaltenic portion.

An essential feature of the present invention involves the utilization of catalytic composites having different physical properties. It is understood that these catalytic composites may be disposed in individual, separate reaction zones in series flow, or in a single reaction zone in "piggy-back" fashion. It is further understood that the particular section of catalytically active metallic components is not essential, and that the two catalytic composites may have the same, or different chemical composition. In the art of catalysis, the physical properties of a catalytic composite are considered to be the apparent bulk density, the surface area, the pore volume and the average pore diameter. With respect to the pore volume of the catalytic composite, the art considers the macropore volume (MPV) thereof to consist of those pores having pore diameters in the range of 117 to 58,000 Angstroms. The present invention is found upon recognition of the fact that a catalytic composite, less than 50 percent of the macropore volume of which is characterized by pores having pore diameters greater than about 1000 Angstroms is highly efficient for the desulfurization and hydrocracking of black oils. Conversely, a catalytic composite, more than 50 percent of the macropore volume of which is characterized by pores having pore diameters greater than 1000 Angstroms is highly efficient for the conversion of insoluble asphaltenes, notwithstanding its relatively low degree of hydrocracking activity.

The catalytic composites, for utilization in the present process, comprise metals selected from Groups VI-B and VIII of the Periodic Table combined with a porous carrier material. Metals from Group VI-B and VIII are intended to include those indicated in the Periodic Table of Elements, E. H. Sargent & Company, 1964. Thus, the catalytic composite may comprise one or more metallic components from the group of molybdenum, tungsten, chromium, iron, cobalt, nickel, platinum, palladium, iridium, osmium, rhodium, ruthenium and mixtures thereof. In view of the expense involved with the noble metals of Group VIII, the preferred Group VIII metals are iron, cobalt and nickel. The porous carrier material may comprise alumina, silica, zirconia, magnesia, titania, boria, strontia, hafnia, and mixtures of two or more including silica-alumina, silica-zirconia, silica-magnesia, silica-titania, alumina-zirconia, alumina-magnesia, silica-titania, alumina-zirconia, alumina-magnesia, alumina-titania, magnesia-zirconia, titania-zirconia, silica-alumina-zirconia, etc. It is preferred to utilize a porous carrier material containing at least a portion of silica and preferably a composite of alumina and silica containing from about 10.0 percent to about 90.0 percent by weight of silica.

Although neither the composition, nor the method of preparing the catalytic composite is essential to my invention, certain criteria are observed and are generally preferred. For example, that catalytic composite wherein more than 50.0 percent of the macropore volume is characterized by pores having pore diameters greater than about 1,000 Angstroms, will generally have an apparent bulk density below about 0.40, and generally in the range of from about 0.25 to about 0.40 (grams per cc.). Conversely, the catalytic composite wherein less than 50.0 percent of the macropore volume is characterized by pores having pore diameters greater than 1,000 Angstroms, generally has an apparent bulk density in the range of about 0.4 to about 1.0. One method of effecting the variance in the macropore volume characteristics is through the utilization of boron phosphate as a component of the porous carrier material. Where the porous carrier material contains from about 5.0 percent to about 30.0 percent by weight of boron phosphate, the macropore volume is characterized in that more than 50.0 percent consists of pores having pore diameters greater than about 1,000 Angstroms. Where the porous carrier material contains less than 5.0 percent by weight of boron phosphate, or none at all, the macropore volume is characterized in that less than 50.0 percent contains pores having pore diameters greater than 1,000 Angstroms. Similarly, the macropore volume characteristics are affected by the temperature employed in oxidizing the final catalytic composite. This oxidation treatment effected at elevated temperature, is considered to be the final step in the manufacturing technique designed to produce a finished catalyst. Such oxidation treatment is generally carried out in an atmosphere of air at a temperature in the range of about 800° to about 1,400°F. (427° to 760°C.) My investigations have indicated that the oxidation temperature has an effect on the physical properties of the catalytic composite. Thus, where the catalyst is oxidized at a temperature above about 600°C., and preferably in the range of about 610° to about 650°C., large pores will develop and the macropore volume will be characterized in that 50.0 percent thereof will have pores with pore diameters greater than about 1,000 Angstroms. At temperatures below about 600°C. and preferably in the range of about 550°C. to about 600°C., the less porous composite is obtained.

With respect to the catalytically active metallic components, preferred catalysts contain at least one metallic component from Groups VI-B and VIII. The Group VI-B components, molybdenum, tungsten, or chromium, are utilized in an amount of about 4.0 percent to about 30.0 percent by weight, with molybdenum and/or tungsten being particularly preferred. The Group VIII metallic components will be employed in amounts within the range of about 1.0 percent to about 10.0 percent by weight, and, as hereinbefore set forth, the iron-group metals, iron, cobalt, and nickel, are generally preferred.

The following example is given to further illustrate the process of my invention. It is understood that the example is given for the sole purpose of illustration and is not to be considered to limit unduly the generally broad scope and spirit of the appended claims.

EXAMPLE

This example is presented for the purpose of illustrating further my invention as hereinbefore set forth.

Catalyst A was prepared by impregnating spherical (1/16-inch) silica-alumina particles, 60.0 percent by weight of silica, with an aqueous solution of nickel nitrate hexahydrate and tungstic acid. The finished catalyst, after drying and calcination at about 600°C. indicated 1.6 percent nickel and 13.5 percent tungsten on an elemental weight basis.

Analyses of catalyst A further indicated an apparent bulk density of about 0.77 grams/cc., a surface area of 289 square meters per gram, a pore volume of 0.60 cc./gram and an average pore diameter of 83 Angstroms. The total macropore volume was 0.1073, and the distribution of pores, by pore diameter, in the macropore volume range, was found to be that shown in the following Table I:

TABLE I

| MPV CHARACTERISTICS, CATALYSTS "A" | |
|---|---|
| Pore Diameter Range, A. | MPV, Percent Of Total |
| 117-200 | 86.1 |
| 200-300 | 6.0 |
| 300-500 | 3.5 |
| 500-1000 | 1.4 |
| 1000-1750 | 0.8 |
| 1750-3500 | — |
| 3500-58000 | 2.2 |

This catalyst has 97.0 percent of its macropore volume characterized by pores having pore diameters less than 1,000 Angstroms.

Catalyst B, the highly porous catalyst, was prepared by initially blending aluminum sulfate and acidified water glass in amounts to yield 88.0 percent by weight alumina. The precipitation was effected through the addition of the blend to ammonium hydroxide, with all precipitation taking place at a pH above 8.0. The gel, or precipitate, was washed free of sulfate and sodium ions in a catalyst washing tower, and subsequently reslurried in hot water. A boric acid-phosphoric acid solution, in a mole ratio of 1:1, was added in an amount which resulted in a solids content of about 68.0 percent alumina, 10.0 percent silica and 22.0 percent boron phosphate on a weight basis. The gel was then dried at a temperature in the range of 200° to 400°F., and ground to a size approximating 10–30 mesh. Impregnation of this granular carrier material was effected through the use of an aqueous solution of nickel nitrate hexahydrate and molybdic acid (about 80.0 percent MoO₃) in sufficient quantities to result in a finished catalyst containing 2.0 percent by weight of nickel and 16.0 percent by weight of molybdenum, calculated as the elemental metals. The impregnated material was dried and calcined, in an air atmosphere, for 1 hour at a temperature of about 600°C. Analyses indicated that the finished catalyst had an apparent bulk density of about 0.32 grams/cc., a surface area of 215 square meters per gram, a pore volume of 0.49 cc./gram and an average pore diameter of about 91 Angstroms. The total macropore volume, 1.1245 cc./gram, was determined by mercury porosimeter analysis. The following Table II illustrates the distribution of pores, of varying diameter, in the macropore volume range of 117 to 58,000 Angstroms.

TABLE II

| MPV CHARACTERISTICS, CATALYST "B" | |
|---|---|
| Pore Diameter Range, A. | MPV, Percent Of Total |
| 117–200 | 23.9 |
| 200–300 | 2.5 |
| 300–500 | 4.6 |
| 500–1000 | 6.5 |
| 1000–1750 | 6.8 |
| 1750–3500 | 9.3 |
| 3500–58000 | 46.4 |

From the foregoing table, it will be ascertained that this catalyst has 62.5 percent of its macropore volume characterized by pores with pore diameters greater than about 1,000 Angstroms.

The Relative Activity (RA) test procedure is based upon the conversion of heptane-insoluble asphaltenes contained in a 950°F.-plus vacuum tower bottoms product having a 27.0 percent volumetric distillation temperature of about 1,050°F., and containing 4.7 percent by weight of heptane-insoluble asphaltenes and 3.25 percent by weight of sulfur. With respect to hydrocracking, the relative activity is based upon conversion of 1,050°F.-plus charge stock to 1,050°F.-minus, lower boiling product. In the testing procedure, the catalyst is disposed in a ⅞-inch (nominal internal diameter) reactor in alternate layers of 10.0 cc. of catalyst and 2.0 cc. of 60–80 mesh sand.

A total of 150 cc. of catalyst is employed, and a quartz chip preheat section is used above the first layer. The reactor is pressured to 3,000 psig., with a circulating stream of hydrogen, and the catalyst inlet temperature slowly raised to a level of 300°C. While maintaining this temperature, the hydrogen recycle rate is established at about 15,000 scf./bbl. and the charge stock is introduced. After about 300 grams of charge stock have passed through the catalyst beds, the inlet temperature of the catalyst is raised to 380°C.

Following a 27-hour lineout period, two test periods, of four hours duration each, are effected at the higher temperature and at varying liquid hourly space velocities of 0.5 and 1.0, all other conditions being maintained constant. The results of the two test periods are plotted on semilogarithmic coordinates as a function of the reciprocal of the LHSV. The slope of the resulting straight line is utilized to determine the RA of the tested catalyst. The ratio of the slope of the tested catalyst to that of a standard catalyst, or other tested catalyst, (assigned an RA of 100) when multiplied by 100, is the relative activity of the tested catalyst.

In the present illustration, catalyst B, the more porous of the two composites, was assigned a relative activity of 100 with respect to both asphaltene conversion and hydrocracking activity. A comparison of catalysts A and B is presented in the following Table III:

TABLE III

| | CATALYST COMPARISON* | |
|---|---|---|
| Catalyst Designation | B | A |
| Heptane insolubles, wt. % | 0.28 | 1.56 |
| Sulfur, wt. % | 0.15 | 0.11 |
| Vol. distilled at 1050°F. | 87.0 | 90.2 |
| RA, heptane insolubles | 100 | 25 |
| RA, hydrocracking | 100 | 121 |

*The analytical data are those from the test period at 0.5 LHSV

The ⅞-inch reactor tube was then loaded with 70 cc. of catalyst A, in seven 10 cc. alternating beds with 2 cc. of sand, above 80 cc. of catalyst B, in eight 10 cc. alternating layers with 2 cc. of sand. Thus while the quantity of each catalyst was approximately halved, the total amount of catalyst remained at 150 cc. A relative activity test, as above described, was performed, the results of which are presented in the following Table IV:

TABLE IV

| RELATIVE ACTIVITY, PIGGYBACK CATALYST SYSTEM | |
|---|---|
| Heptane insolubles, wt. % | 0.16 |
| Sulfur, wt. % | 0.1 |
| Vol. distilled at 1050°F. | 90.5 |
| RA, heptane insolubles | 128 |
| RA, hydrocracking | 125 |

From the above data, again those from the test period at 0.5 LHSV, it will be readily ascertained that the desirable attributes of both catalysts have been advantageously employed. Considering that only half of each catalyst was employed —70 cc. of A and 80 cc. of B, versus 150 cc. of each —these results are surprising and unexpected.

The foregoing illustrates the present invention and the benefits afforded through the utilization thereof.

I claim as my invention:

1. A process for the desulfurization and hydrocracking of a heavy hydrocarbon oil containing sulfur and asphaltenes, which comprises reacting said oil with hydrogen in a first reaction stage to desulfurize said oil, reacting the effluent from said first stage in a second reaction stage to hydrocrack and desulfurize the oil further, said first and said second reaction stages being carried out in contact with a supported catalyst composite comprising a metal from Group VI-B and a metal from Group VIII of the Periodic Table with alumina containing from about 10.0 percent to about 90.0 percent by weight of silica, said catalyst composite being characterized by having a macropore volume consisting of pores having pore diameters in the range of 117 to 58,000 Angstroms, less than 50 percent of the macropore volume of said catalyst in said first stage being characterized by pores having pore diameters greater than about 1000 Angstroms and more than 50 percent of the macropore volume of the catalyst in said second stage being characterized by pores having pore diameters greater than about 1000 Angstroms.

2. The process of claim 1 further characterized in that said composite contains less than about 5 percent by weight of boron phosphate.

3. The process of claim 1 further characterized in that said composite contains from about 5 percent to about 30 percent by weight of boron phosphate.

4. The process of claim 1 further characterized in that said catalyst composite contains from about 4 percent to about 30 percent by weight of said Group VI-B metal component and from about 1 percent to about 10 percent by weight of said Group VIII metal component.

* * * * *